W. FINN.
MOLD OPENING DEVICE.
APPLICATION FILED OCT. 18, 1920.
1,418,635.
Patented June 6, 1922.
2 SHEETS—SHEET 1.
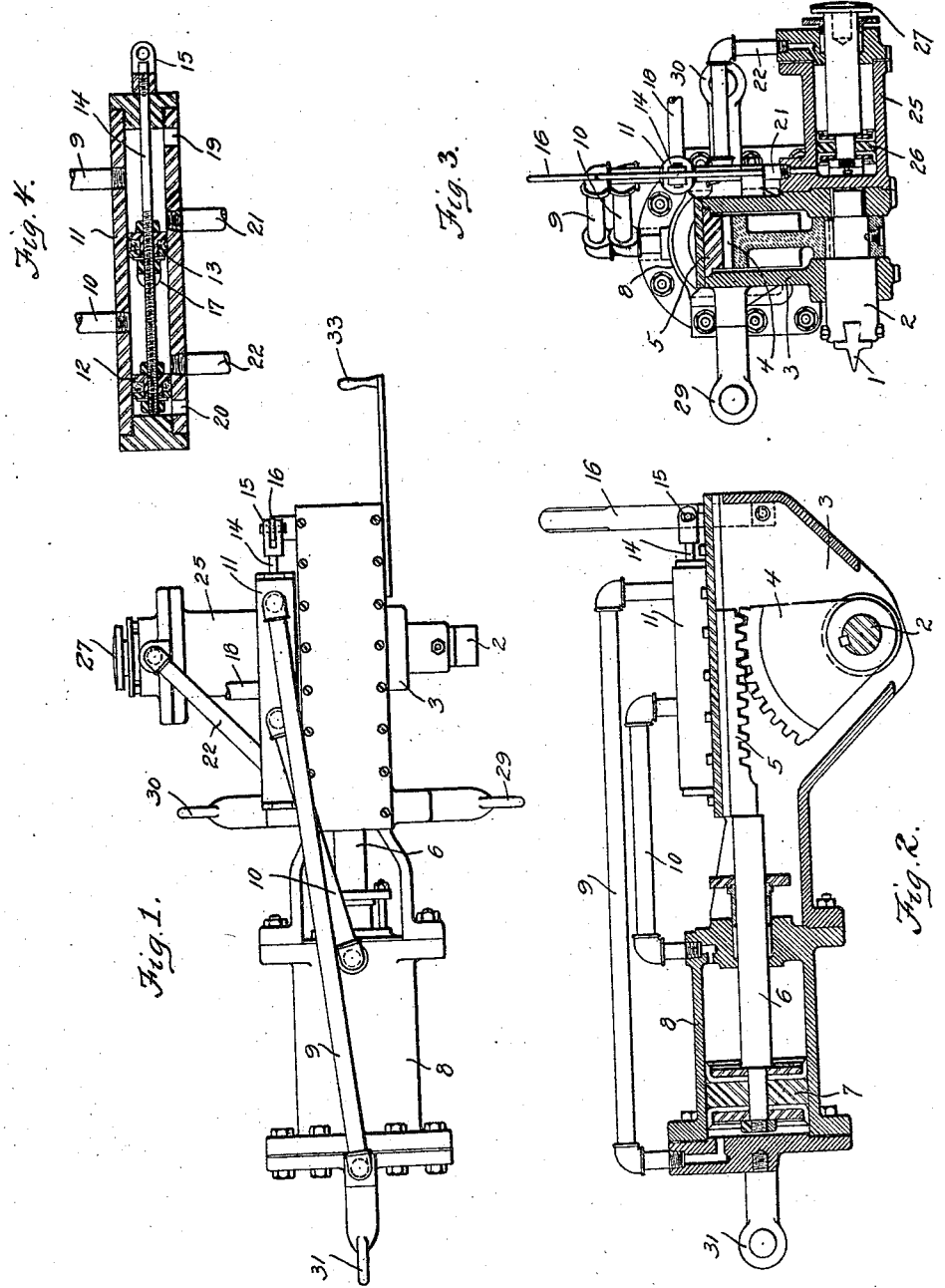
INVENTOR.
William Finn,
BY Ernest Hopkinson
his ATTORNEY.

W. FINN.
MOLD OPENING DEVICE.
APPLICATION FILED OCT. 18, 1920.
1,418,635.
Patented June 6, 1922.
2 SHEETS—SHEET 2.
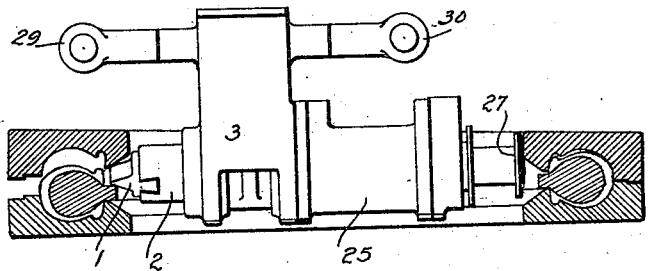
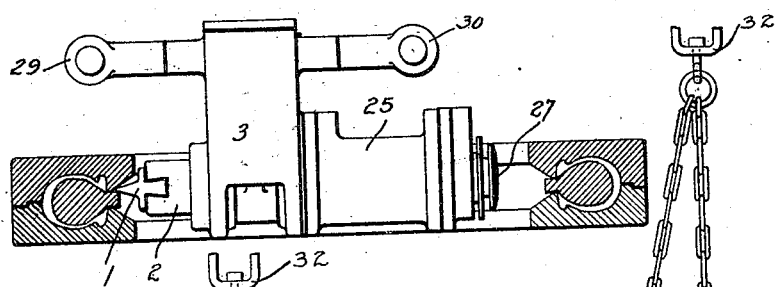
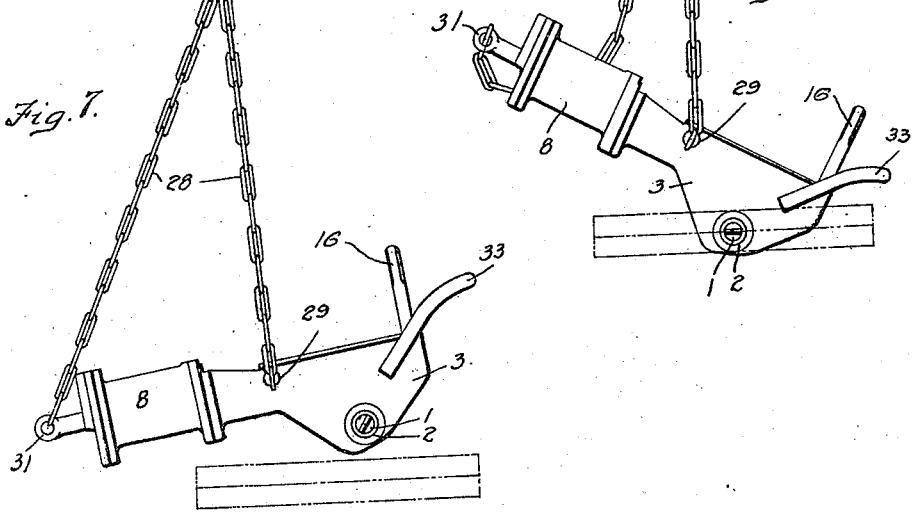
INVENTOR.
William Finn.
BY Ernest Hopkinson
his ATTORNEY.

UNITED STATES PATENT OFFICE.

WILLIAM FINN, OF DETROIT, MICHIGAN, ASSIGNOR TO MORGAN & WRIGHT, A CORPORATION OF MICHIGAN.

MOLD-OPENING DEVICE.

1,418,635.              Specification of Letters Patent.      Patented June 6, 1922.

Application filed October 18, 1920. Serial No. 417,626.

*To all whom it may concern:*

Be it known that I, WILLIAM FINN, a citizen of the United States, residing at Detroit, county of Wayne, and State of Michigan, have invented certain new and useful Improvements in Mold-Opening Devices, of which the following is a full, clear, and exact description.

Usually in the manufacture of tires, the articles either supported in a core or by internal fluid pressure are cured between the sections of a mold. After curing the mold and the core, if used, have to be separated to remove the tire. Heretofore this has been accomplished by manually prying the sections apart. The operations are exhausting and sometimes require prolonged exertion.

The present invention aims to provide a labor saving device that is simple and quick in operation, relieving the operator of almost all manual effort and making it easy to keep workers at the task.

With the illustrated embodiment of the invention in mind and without intention to unnecessarily limit the scope of the invention, it comprises a wedge that may be power operated to enter it between parts of a mold and also to twist it so as to further loosen or separate the sections from each other and from the core, if the latter be used.

The invention is illustrated in the accompanying drawings, in which:

Fig. 1 is a plan view of the device.

Fig. 2 is a sectional elevation of Fig. 1.

Fig. 3 is an end elevation showing one of the cylinders in section as also a rack and gear for turning the wedge.

Fig. 4 is a detail showing a serviceable type of balanced valve in vertical cross section for controlling the passage of fluid under pressure to two cylinders.

Figs. 5 and 6 show the application of a device to a mold at the beginning and ending respectively of a separating operation, and Figs. 7 and 8 illustrate a chain suspension for the device which is shown diagrammatically in relation to a mold in idle and working relations, respectively.

In the drawings a wedge 1 is suitably mounted in the end of a stub shaft 2 which is journaled in the frame 3 that houses a mutilated gear 4, keyed to the shaft 2 and adapted to be operated by a rack 5 on the end of a piston rod 6 whose piston 7 is reciprocable in a cylinder 8. Fluid such as air, steam or water under pressure is adapted to be passed to and from the cylinder 8 through pipes 9 and 10 which are connected to the casing of a valve chest 11 containing spaced and balanced pistons 12 and 13 mounted on a rod 14 that is loosely connected as indicated at 15 to an operating lever 16. Fluid under pressure (and preferably compressed air) is supplied to the chest 11 through a port 17 which is connected to a suitable source of supply through a line 18. By manual movement of the piston valves 12 and 13 compressed fluid may be supplied to either end of the cylinder 8 while the other end is exhausted through ports 19 or 20 provided in the opposite ends of the valve chest 11. And the resulting movement of piston 7 will impart a turning movement to the wedge 1.

Through the lines 21—22 fluid under pressure may be passed to and from the opposite ends of a second cylinder 25 (at right angles to the above described cylinder 8) to actuate a piston 26, the end 27 of whose rod is adapted to react or to be thrust against one side of the inner annular periphery of the mold, in the operation of inserting the wedge 1.

The several pipe connections 9—10 and 21—22 are unequally spaced on opposite sides of the centrally located admission port 17 in the chest 11 so that operation of the hand lever 16 from the position shown in Figs. 2 and 4 to the right will (1) admit fluid under pressure through the line 21 in front of the piston 26 to force the wedge 1 between the mold sections as illustrated in Fig. 5, and (2) subsequently admit fluid under pressure through line 9 to the front side of the piston 7 to actuate the rack and pinion 5 and 4 and turn the wedge 1, thus completing the separation of the mold sections as illustrated in Fig. 6. Simultaneously with the supply of fluid under pressure to the front ends of the cylinders 8 and 25, the opposite ends thereof are exhausted through the lines 22 and 10 respectively; the exhaust passing out through the orifice 20 in the valve chest 11. In moving the hand lever in the opposite direction to that previously mentioned, the operations are repeated in the reverse order, wedge 1 being first turned to a position substantially parallel with the plane of the mold and then withdrawn from between the sections, the plunger 27 being retracted to the position shown in Fig. 3.

The cylinders 25 and 8 are suitably secured to the frame 3 to form therewith a unitary structure that is adapted to be sustained by chains 28 separately connected at one of their ends to the apertured lugs 29, 30 and 31, which extend laterally and longitudinally of the device as shown, and the lugs 29 and 30 are preferably located in a line passing approximately through the center of gravity of the entire structure. The upper ends of the chains are suitably united together, preferably being coupled to a swivel 32. This swivel may be suspended from a fixed or a movable support such as a trolley. The fixed support is preferable when the device of the present invention is to be used in connection with a conveyor on which the molds, lying flat, are carried to and from the presses. But where there is no conveyor or other means for shifting the mold about, the swivel may be sustained on a movable support such as a trolley and the mold opening device shifted so as to bring it into a convenient position for operation on a mold.

In any event the mold opener is normally swung so as to clear the molds which are usually handled in a horizontal position, the relation of the opener and of the molds being indicated diagrammatically in Fig. 7. By depressing the handle 33 which is suitably fixed to one end of the frame 3 the mold opener may be depressed more or less axially of the annular opening therein to bring the wedge 1 into the plane of the line of cleavage between the mold sections. This depressing of the mold opener is rendered easy by the location of the lugs 29 and 30 in a line approximately intersecting the center of gravity where the device is nearly balanced. When in the position shown in Fig. 8 the operator manipulates the lever 16 to govern the movements of the wedge 1 which is first inserted between the mold sections or a section of the mold and core as illustrated in Fig. 5, and then twisted or turned to complete the separation as illustrated in Fig. 6.

For some classes of work such as the smaller sizes of molds the sections may be separated or loosened sufficiently by movement of the wedge only in the direction of its axis and not angularly, in which case the cylinder 25 could be dispensed with and the wedge proportioned initially to that end.

From the foregoing description, it will be seen that I have provided a novel combination and arrangement of parts for efficiently and rapidly "breaking" molds without undue expenditure of labor and by a construction that may be quickly brought into working position contiguous a mold.

Having thus described my invention, what I claim and desire to protect by Letters Patent is:—

1. An annular mold opener having in combination, a wedge, and fluid pressure devices for operating the wedge to separate the mold sections.

2. An annular mold opener having in combination, a wedge, and fluid pressure devices for inserting the wedge between mold sections and turning the same about its own axis.

3. A device for separating annular mold sections from a core having in combination, a member adapted to be inserted between the core and sections, and fluid pressure means for operating said member and separating the sections from the core.

4. A device for separating annular mold sections from a core having in combination, a member adapted to be inserted between the core and sections, and fluid pressure means for moving said member in the direction of and angularly about its own axis.

5. A device for opening annular and sectional molds including in combination, a member introducible between mold sections, means for manipulating the member to shift one section of the mold relative to the other, and means permitting movement of the member to and from the space enclosed by the annular mold and in the general direction of the axis of the mold.

6. A mold opening device having in combination, a separating tool and power operable means for thrusting the tool between mold sections and turning it to separate the sections.

7. A mold opening device having in combination, a separating tool, and means for thrusting the tool between mold sections and turning it to separate the sections, said means including angularly disposed cylinders and fluid operable devices within said cylinders for actuating the tool.

8. A mold opening device having in combination, a separating tool, and means for thrusting the tool between mold sections and turning it to separate the sections, said means including a rack and gear mechanism for turning the tool and a shiftable member in substantial alinement with the axis of the tool.

9. A mold opening device having in combination, a separating tool, and means for thrusting the tool between mold sections and turning it to separate the sections, said means including fluid pressure cylinders for operating the tool, and a valve constructed to insure sequential admission of fluid to the cylinders whereby the tool is first moved axially and then angularly about its own axis in the opening of a mold.

10. A mold opening device having in combination, a separating tool, and means for thrusting the tool between mold sections and turning it to separate the sections, said means including fluid pressure cylinders for operating the tool, and a valve constructed to insure sequential admission of fluid to the cylinders whereby the tool is first moved axially and then angularly about its own axis in the opening of a mold, and manual means for governing the operation of said valve.

Signed at Detroit, Michigan, this 12th day of October, 1920.

WILLIAM FINN.